United States Patent

[11] 3,573,641

[72] Inventor George E. Zenk
Minneapolis, Minn.

[21] Appl. No. 626,177
[22] Filed Mar. 27, 1967
[45] Patented Apr. 6, 1971
[73] Assignee Control Data Corporation
Minneapolis, Minn.

[54] ELECTRONIC FILTER
6 Claims, 6 Drawing Figs.

[52] U.S. Cl. 328/165, 307/237, 325/377, 325/473, 328/151, 328/167
[51] Int. Cl. H03b 15/00
[50] Field of Search 307/230, 233, 235, 237; 325/377, 473; 328/135, 139, 151, 162, 165, 167

[56] References Cited

UNITED STATES PATENTS

| | | | |
|---|---|---|---|
| 2,985,775 | 5/1961 | Sollecito | 307/229 |
| 2,985,836 | 5/1961 | Hatton | 307/235X |
| 3,094,665 | 6/1963 | Wildman | 328/117X |
| 3,173,095 | 3/1965 | Wagner | 307/237X |
| 3,251,996 | 5/1966 | Johnson et al. | 307/237X |
| 3,348,065 | 10/1967 | Schmidt | 307/294X |

*Primary Examiner*—Donald D. Forrer
*Assistant Examiner*—R. L. Woodbridge
*Attorneys*—Bruce A. Nemer and Thomas G. Devine

ABSTRACT: A circuit for scanning celestial space and discerning the presence of bodies in a varying amplitude noise background is disclosed. Signal inputs provided by the sensor are compared to a signal indicative of the noise background envelope to eliminate the effect of the noise. A circuit for deriving the noise background envelope is also disclosed.

Patented April 6, 1971 3,573,641

2 Sheets-Sheet 1

INVENTOR.
GEORGE E. ZENK
BY Bruce A. Neme
AGENT

INVENTOR.
GEORGE E. ZENK
BY Bruce A. Nemer
AGENT

ELECTRONIC FILTER

CROSS REFERENCES

The use of the present invention in a complete celestial guidance system is disclosed in an article entitled "Automatic Celestial Guidance, Part II: New Challenge to Designers Ingenuity" by Lillestrand, Carroll, and Newcomb which appeared in the Apr. 4, 1966 issue of Electronics Magazine.

BACKGROUND

Noise is a problem in any system which attempts to sense specific objects in an environment. Noise is a particular problem in an optical system attempting to find a celestial body. Extraneous light from various sources interferes with the search and forms a varying amplitude noise background. The present invention arose to fill the need for a circuit which would remove the varying background of noise and allow the passage of informational signals.

Two solutions have been used in the past. The first solution filters the input signal to allow only a band of frequencies indicative of an informational input. Construction of a linear noise filter, however, is complex and expensive.

The second solution compares the input signal to a fixed reference and provides an output whenever the input signal exceeds that reference. In the presence of a large, variable noise background, however, the reference threshold needed to prevent noise from providing an output is so high as to prevent informational signals from creating an output in the presence of a low noise background. Therefore, information is lost under this system.

the solution offered by the present invention is to derive a variable threshold from the noise level received at the input. Therefore, the threshold level varies directly as the noise level, and a pulse is discerned when it exceeds the background noise by a given amount. Thus, the present invention offers a simple and relatively inexpensive method to provide good results.

DESCRIPTION

It is an object of the present invention to provide circuitry which will enable the selection of signals from a time varying background of noise.

Further objects and advantages may be ascertained from an understanding of the description of the illustrative embodiment of the invention and from the appended claims.

The illustrative embodiment may be best described by reference to the accompanying drawings where:

Figures 1, 2, 3, 4, 5:
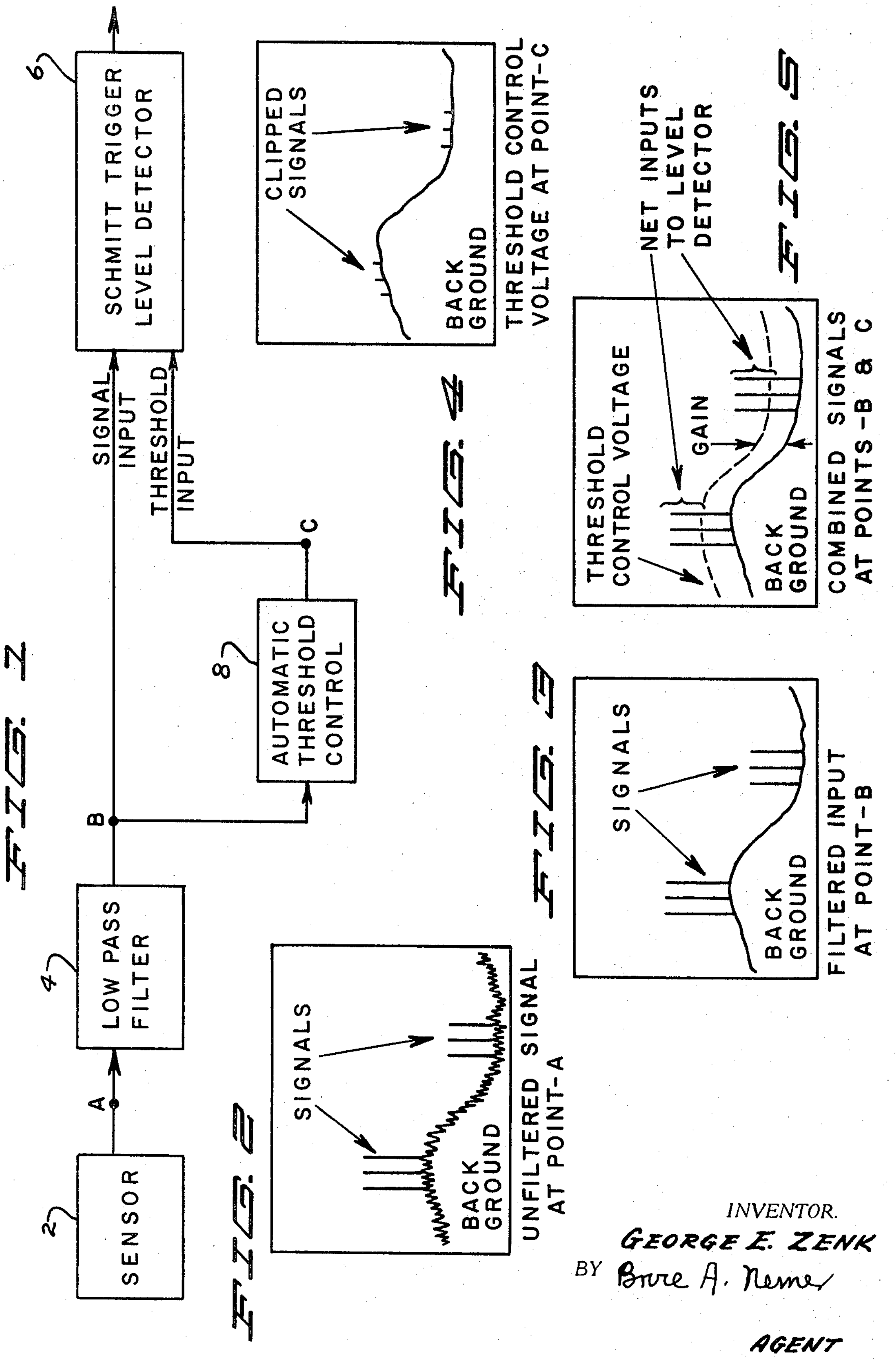
FIG. 1 shows a sensing system using the teachings of the present invention.
FIG. 2 shows the signal resulting at point A within FIG. 1.
FIG. 3 shows the signal resulting at point B within FIG. 1.
FIG. 4 shows the signal resulting at point C within FIG. 1.
FIG. 5 shows the combination of signals at points B and C within FIG. 1.

In FIG. 1, the output of a sensor 2 is connected to a low pass filter 4. Point A is at the output of sensor 2. The output of filter 4, is connected to a first input to a Schmitt trigger level detector or comparing circuit 6 and to an automatic threshold control 8. Point B is at the output of filter 4. The output of threshold control 8 is connected to a second input to level detector 6. Point C is at the output of the threshold control 8.

Figure 6:
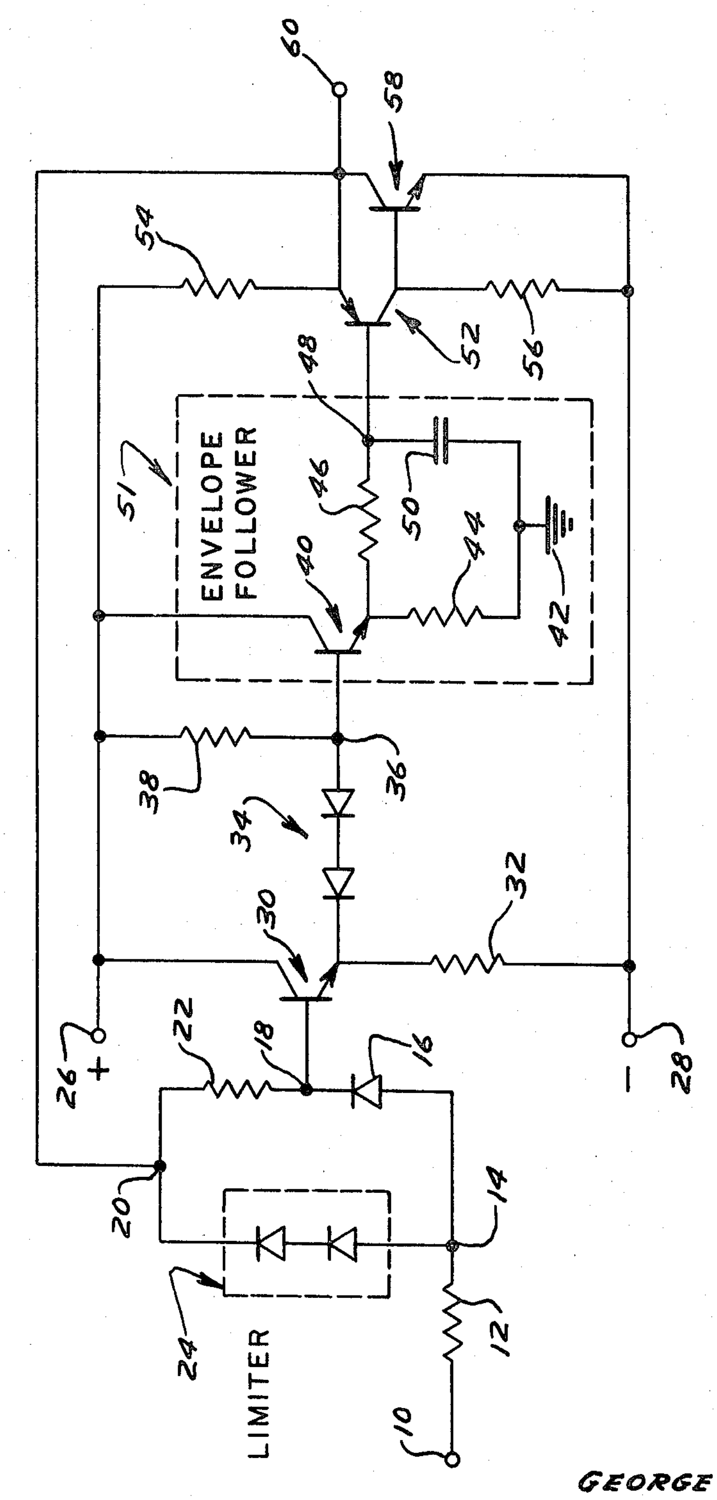
FIG. 6 shows one embodiment of a block labeled "Automatic Threshold Control" within FIG. 1.

In FIG. 6, an input means 10 is shown which is adapted to receive an input signal comprising pulses superimposed upon a background of noise. A resistor 12 is connected between input means 10 and a junction point 14. A diode 16 has its anode connected to junction point 14 and its cathode connected to a junction point 18. Junction point 18 is connected to a junction point 20 by a resistor 22. Two diodes, nonlinear conductance means, or limiter means 24 are connected series aiding with the anode of the first connected to junction point 14 and the cathode of the second connected to junction point 20. Junction point 20 forms a reference or limit signal input means for limiter means 24. A terminal 26 is shown which is adapted to be connected to a source of positive DC potential. A terminal 28 is also shown which is adapted to be connected to a source of negative DC potential. A transistor 30 has its base connected to junction point 18, its collector connected to terminal 26, and its emitter connected to terminal 28 through an emitter resistor 32. Two diodes 34 are connected series aiding with the cathode of the first connected to the emitter of transistor 30 and the anode of the second connected to a junction point 36. A resistor 38 is connected between junction point 36 and terminal 26. A transistor 40 has its base connected to junction point 36, its collector connected to terminal 26, and its emitter connected to a reference potential or ground 42 through an emitter resistor 44. Another resistor 46 connects the emitter of transistor 40 to a junction point 48. A capacitor or energy storage means 50 is connected between junction point 48 and ground 42. The circuit 51 comprising transistor 40, resistor 44, resistor 46, and capacitor 50 acts as an envelope follower. A transistor 52 has its base connected to junction point 48, its emitter connected to terminal 26 through an emitter resistor 54, and its collector connected to terminal 28 through a collector resistor 56. A transistor 58 has its base connected to the collector of transistor 52, its collector connected to the emitter of transistor 52, and its emitter connected to terminal 28. An output means 60 which is adapted to provide an output signal proportional to the envelope of the input noise background is also connected to the emitter of transistor 52. "Proportional to" is used for the purpose of this specification as meaning related to and varying as—not necessarily directly proportional to. The emitter of transistor 52 is also connected to junction point 20 to provide the reference or limit signal input.

OPERATION

Generally, the circuit operates by accepting a signal input comprised of desired information and a noise background, forming a signal which follows the noise background envelope, and comparing the signal input and the noise background envelope to substantially eliminate the effect of the noise.

In particular with reference to FIG. 1, sensor 2 provides a signal input comprised of desired information and a time varying background of noise. This is illustrated by FIG. 2. Filter 4 eliminates frequencies beyond the range of interest. The output of filter 4 is illustrated in FIG. 3. The filtered output is then operated on by threshold control 8 to form a signal indicative of the envelope of the noise background. The output of threshold control 8 is illustrated in FIG. 4. An embodiment of threshold control 8 is illustrated in FIG. 6. The outputs from filter 4 and threshold control 8 are then compared in level detector 6. Level detector 6 is familiar to those skilled in the art and merely provides a signal output when the signal input from filter 4 exceeds the output from threshold control 8 by more than a predetermined amount. The extraction of the desired information by this comparison is illustrated in FIG. 5.

It is seen that threshold control 8 accepts a signal input comprised of pulses or other information impressed in a noise background. Threshold control 8 generally operates by first limiting the signal amplitude of the input with respect to a previously determined noise level and then applying the limited signal to an envelope following circuit. The result is a varying DC voltage which is proportional to or representative of the envelope of the noise background, as illustrated in FIG. 4.

Specifically, with reference to FIG. 6, assume that a noise signal with pulses superimposed upon it is applied to input means 10. The signal also appears at junction point 14. If the voltage at junction point 14 exceeds the volt at junction point 20 or reference signal input by more than two diode voltage drops, diodes 24 limit the signal appearing at junction point 14. Since the output voltage is applied to junction point 20, the input signal is limited with respect to the output signal, which is representative of the previously determined noise level. This means that any signal appreciably above the previously determined noise level is shunted to AC ground through diodes 24 and transistor 58. This is necessary if the informational pulses are to be prevented from appreciably contributing to the output wave form which is to be a signal indicating the variations of the noise background with respect to time—the noise envelope. The thus limited signal is then conducted through diode 16 to transistor 30—which acts as an emitter follower.

Next the signal is conducted through diodes 34 to the peak follower, integrating, or envelope detecting portion of the circuit which is comprised by transistor 40, resistors 44 and 46, and capacitor 50. Initially, capacitor 50 is uncharged. As the signal level on the base of transistor 40 increases, capacitor 50 begins to charge through resistor 46. When capacitor 50 charges to within one diode drop of the voltage level at the base of transistor 40, a stable condition is reached. Any decrease in voltage after the stable condition is reached will render transistor 40 nonconducting because its emitter base junction will be reversed biased by the decrease in signal. During the time transistor 40 is reversed bias, capacitor 50 discharges through resistor 46 and resistor 44. If resistor 46 has a small ohmic value and resistor 44 has a large ohmic value, capacitor 50 will charge quickly and discharge slowly. It is seen that this operation provides envelope or amplitude detection since the envelope or variation of the amplitudes of the noise is a much slower function of time than the frequencies involved in the noise itself. The decay of the voltage on capacitor 50 need be controlled only to respond to the fastest decay of the envelope signal in order that the voltage follow the noise amplitude variations or envelope. This is achieved by selecting the size of resistor 44. The slower the variations in noise amplitude the larger resistor 44 may be and thus the slower capacitor 50 will discharge. Resistor 46 is chosen with regard to the delay desired in the limiting circuit.

A delay is needed since the voltage upon capacitor 50 is ultimately applied as the reference signal appearing at junction point 20, and it is this voltage that determines the clipping level. If the voltage from capacitor 50 is able to change very rapidly, the clipping level is able to change very rapidly. This means that the clipping level will vary during a high-amplitude input pulse. This condition is not desirable and may be eliminated by creating a delay between the input signal and the output signal. If the output signal is delayed in time from the input signal, then the new input signal will be limited by comparison to a previously determined output. Thus, if resistor 46 slows the charge time of capacitor 50 for a major portion of an incoming pulse, that incoming pulse will not significantly affect the clipping level. The clipping level will be determined to a greater extent by the noise level immediately preceding the pulse. So, the value of resistor 46 is chosen with regard to the duration of the informational pulse expected at the input.

The voltage developed on capacitor 50 is applied to an output driver comprising transistors 52 and 58 and their associated resistors. This configuration is well known to those skilled in the art and provides an emitter-follower-type output with a higher input impedance than is available from an emitter follower.

The selection of other components not previously mentioned follows standard engineering practice. For example, diode 16 prevents a rapid decrease in input signal from damaging the emitter-base junction of transistor 30. Resistor 22 biases diode 16. Resistor 38 biases diodes 34. Diodes 34 in turn provide a DC level shift and temperature compensate the output signal. Without diodes 34, the output signal differs from the input signal by two emitter-base voltage drops With the inclusion of diodes 34, there is no net voltage change from input means 10 to output means 60.

To explain this, assume that a traversal of a diode or emitter base from anode to cathode is a forward traversal, and a traversal of a diode or emitter base from cathode to anode is a reverse traversal. Then, diode 16 is traversed in a forward direction, transistor 30 is transversed in a forward direction, diodes 34 are traversed in a reverse direction, transistor 40 is traversed in a forward direction, and transistor 52 is traversed in a reverse direction. The net traversals equals zero. There is neither an excess of forward traversals or reverse traversals. Since the temperature character characteristics of an emitter-base junction of a transistor and a diode are similar, the circuit is also temperature stabilized by balancing voltage drops and rises in the signal path.

It is believed obvious to one skilled in the art that a wide range of values and types may be assigned to the individual components in the embodiment shown in order to have proper performance. As previously explained, the values of certain components should be chosen with respect to the particular incoming signal expected. One set of value found to perform well in the presence of a 2½millisecond pulse and with 12-volt positive and negative power supplies is:

resistor 12–6.8 kilohms
diode 16–IN456
resistor 22–68 kilohms
diodes 24–IN456
transistor 30–2N3405
resistor 32–10 kilohms
diodes 34–1N456
resistor 38–15 kilohms
transistor 40–2N3405
resistor 44- 47 kilohms
resistor 46–8.2 kilohms
capacitor 50–10.0 microfarads
transistor 52–2N3405
resistor 54–10 kilohms
resistor 56–100 kilohms
transistor 58–2N3405

It will be obvious to those skilled in the art that many variations may be made within the teachings of the present invention. For example, any sensor may be use.

Also, limiter circuits in a form other than diodes may be used in the circuit of FIG. 6. Any nonlinear means may be substituted for diodes 24—for example a biased transistor, gating circuit, or battery. The limiting must be with respect to the signal output, however, to stay within the teachings of the present invention.

Additionally, any comparing means may be substituted for Schmitt trigger level detector 6 within FIG. 1. Magnetic comparisons and differential comparisons are examples.

Further, a low-pass filter may not be necessary in all embodiments. One reason for this is the frequency response of the sensor—the sensor may act as its own low pass filter.

Power supplies not shown may be necessary to provide power to some of the circuitry in the blocks.

The description of the present invention is for illustrative purposes only and is not intended as a limitation. Many alternates and variations will be obvious to one skilled in the art. It is desired that the present invention be limited only by the appended claims in which it is intended to cover the full scope and spirit of the present invention.

I claim:

1. Electrical apparatus for sensing a signal comprising pulses superimposed upon a varying amplitude background of noise and providing an output which is proportional to the envelope of the noise background comprising:

a. an input means for receiving the signal;

b. a limiter, connected to the input means, for limiting with respect to a signal at a limit signal input;

c. an envelope following circuit connected to receive the signal from the limiter and provide a signal output which follows the variations in envelope of the signal from the limiter;

d. output means connected to receive the signal from the envelope following circuit; and e. means connecting the output means to the limit signal input of the limiter for providing the signal to be used in the limiting process.

2. Electrical apparatus for separating information pulses from a composite signal comprising said information pulses and a background of noise having varying intensity, comprising:

a. limiting means receiving the composite signal and a limit signal, for limiting pulses in the composite signal greater than the limit signal;
b. means for providing an output indicating the envelope of the combination of said limited pulses and said noise background;
c. comparing means receiving the composite signal and the output of the envelope indicating means for providing an output signal whenever the composite signal exceeds the output of the envelope indicating means by more than a predetermined amount; and
d. means for supplying the output of said envelope indicating means to the limit signal input of said limiting means.

3. An electronic filter accepting a composite signal input comprised of desired information and a background of noise and providing a signal output comprised of the desired information, comprising:

a. limiting means receiving the composite signal and the limit signal, for limiting pulses in the composite signal greater than the limit signal;
b. integrating means, receiving the output of the limiting means, for providing an output comprised of the time integral of the output means decreased by a decay factor;
c. means for providing the output of the integrating means to the limit signal input of the limiting means; and
d. comparing means receiving the composite signal and the output of the integrating means for providing a signal output when the composite signal exceeds the output of the integrating means by a predetermined amount.

4. The apparatus of claim 3 wherein the integrating means comprises:

a. storage means;
b. impedance means connected to the storage means for allowing rapid signal accumulation by the storage means; and
c. additional impedance means connected to the storage means for allowing the signal accumulated by the storage means to decay slowly.

5. An electronic filter accepting a composite signal input comprised of desired information and a background of noise and providing a signal output comprised of the desired information comprising:

a. nonlinear means receiving a composite signal, and having a referenced input means for providing a signal output which does not exceed the signal at the referenced input by more than a predetermined amount;
b. means receiving the output of the nonlinear means and providing an output following the changes in a smooth curve fitted to the points comprising the peaks of the input signal;
c. means for connecting the output of the curve following means to the referenced input of the nonlinear means; and
d. comparing means receiving the composite signal and the output of the curve following means for providing a signal output when the composite signal exceeds the output of the curve following means by a predetermined amount.

6. An electronic filter for accepting a signal input comprised of desired information and a background of noise and providing a signal output comprised of the desired information, comprising:

a. a limiter receiving the composite signal and a limit signal input for limiting the composite signal with respect to the limit signal input;
b. an envelope following circuit receiving the output signal from the limiter and providing a signal output which follows the variations in envelope of the signal from the limiter;
c. means connecting the output of the envelope following circuit to the limit signal input of the limiter for providing the signal to be used in the limiting process; and
d. comparing means accepting the composite signal input and the output of the envelope following circuit for providing a signal output when the composite signal input exceeds the output of the envelope follower circuit by a predetermined value.